C. F. KETTERING.
STORE SERVICE CREDIT SYSTEM APPARATUS.
APPLICATION FILED DEC. 14, 1904.

975,533.

Patented Nov. 15, 1910.

C. F. KETTERING.
STORE SERVICE CREDIT SYSTEM APPARATUS.
APPLICATION FILED DEC. 14, 1904.

975,533.

Patented Nov. 15, 1910.
3 SHEETS—SHEET 3.

UNITED STATES PATENT OFFICE.

CHARLES F. KETTERING, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

STORE-SERVICE CREDIT-SYSTEM APPARATUS.

975,533.      Specification of Letters Patent.      Patented Nov. 15, 1910.

Application filed December 14, 1904. Serial No. 236,893.

*To all whom it may concern:*

Be it known that I, CHARLES F. KETTERING, a citizen of the United States, residing at Dayton, in the county of Montgomery and State of Ohio, have invented certain new and useful Improvements in Store-Service Credit-System Apparatus, of which I declare the following to be a full, clear, and exact description.

This invention relates to store systems for regulating the passing of goods to customers on credit, more especially where immediate delivery is to take place with but limited opportunity either for investigation to determine responsibility of purchaser or for surveillance to prevent collusion between salesperson and purchaser. In the larger retail establishments, such as department stores, the problem of attending to this credit matter with celerity and in a manner which will prevent losses is a very grave one. Numerous systems have been tried without giving entire satisfaction. The common complaints are, on the part of the customer, the slowness requiring long periods of waiting before goods can be carried away and on the part of the proprietor's financial losses by reason of goods being taken out on credit when credit should not be given. It is of course recognized that where credit is given there should be some identity of the purchaser as an individual whom the store recognizes as responsible but there should also be some check upon the sales person who takes the orders and delivers the goods and it has not been found satisfactory to rely upon such sales person's judgment as to whether or not credit should be given. It is therefore customary to submit each credit sale to some person, commonly known as the "credit man," whose special duty is to keep track of credit customers so as to be able to pass judgment advisedly upon the responsibility of each purchaser. The approval or O. K. of this credit person is therefore necessary before the goods will be delivered. It will be seen at once that considerable delay ensues when it is necessary to send a messenger to the credit man with a charge slip to be O. K.'ed and await the return of such messenger before goods will be delivered. This has in a measure been remedied by the use of telephones at the various bundle wrapping stations through the medium of which the credit man can be consulted in much shorter time than where a messenger has to be sent with the charge slip. In such a telephone system however the sales person or bundle wrapper has to be relied upon to mark the charge slip as instructed by the credit man to show that the delivery of goods on credit has been authorized. Thus the door is still open to the sales person to pass goods on credit practically on that person's own responsibility.

The general purpose of the present invention is to provide a system for the approval or O. K.'ing of credit sales which will remove any objection on the score of slowness of operation and at the same time provide for the credit man himself doing the marking on the charge slips. To be more specific it is proposed to utilize the telephone as a means of communication between the sales persons or bundle wrappers and the credit desk so that both the identity of the purchaser and the amount of purchase may be instantly made known to the credit man, and it is also proposed to have the marking or stamping device which is located at the bundle counter operated from a distance by the credit man and incapable of manipulation at the place of its location. Communication is established between the various sales persons or bundle wrappers in the different departments of the store and the "credit man" the same as in the usual telephone exchange system, it being understood that the approval or O. K. recording devices located at the various departments may be operated over either the signal or talking circuits established. It is further provided that the presence of the charge slip in the marking or stamping device shall be shown at the receiving station or credit desk so that no attempt will be made to operate the stamping device in the absence of the charge slip. As a further safeguard provision is made for automatically preventing any operation of the marking or stamping device when no charge slip is in position to be marked or stamped notwithstanding the switch may be thrown at the credit desk. If when the credit desk is called from one of the bundle stations and the name of the purchaser and the amount of the purchase spoken but the credit man sees by the signal that the charge slip is not in place in the stamp he will then call the bundle station and direct attention to the absence of the slip, either by some understood signal or by telephonic communication. The latter will be resorted to also in cases where a credit is to be refused and the credit man will instruct the sales person to send the customer to the desk.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings.

Figure 1:
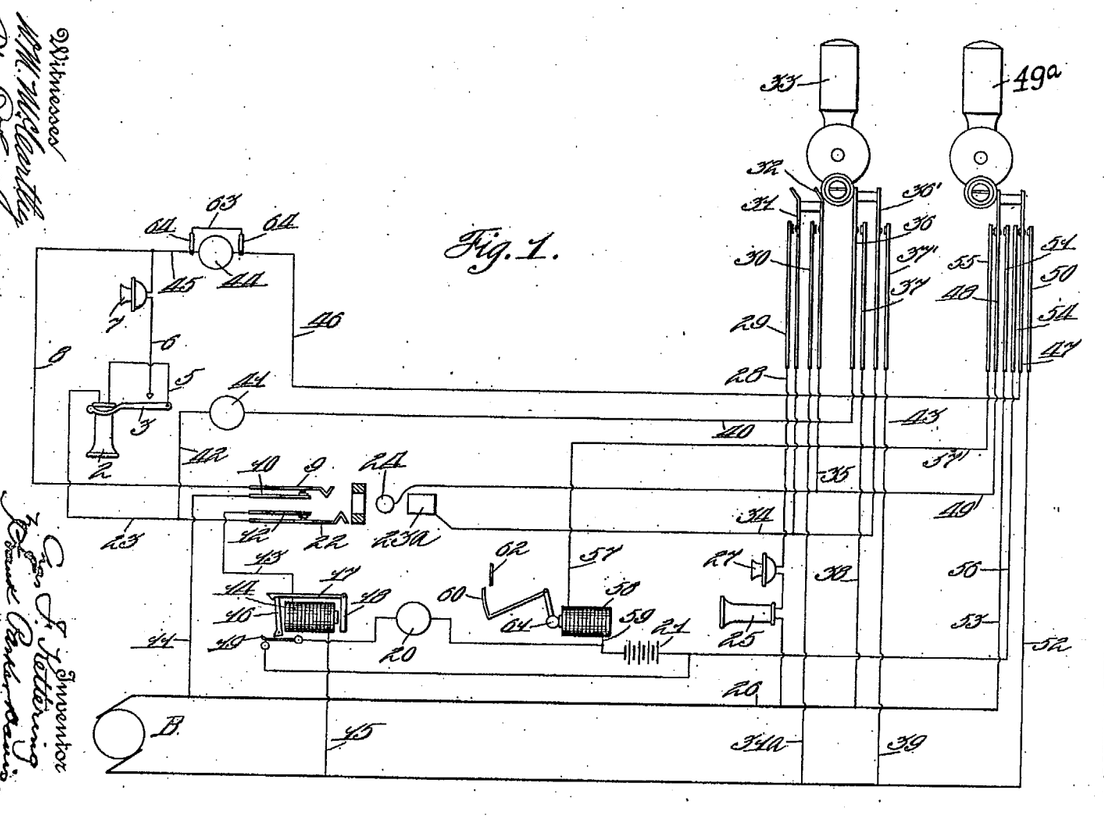
Figure 1 represents diagrammatically a system arranged according to the present invention.

Referring first to Fig. 1, the numeral 2 designates the telephone receiver at a bundle counter which receiver rests in the usual hook 3 constituting a switch for closing a signaling circuit, one wire 5 of which circuit connects with the hook and another wire 6 with a contact terminal confronting the hook lever. The numeral 7 designates the transmitter at this station and 8 a wire running therefrom to one of the jack contacts 9 at the exchange or credit desk. The other contact 10 of this jack set connects by wire 11 with the generator B. One contact 12 of a companion jack set connects by wire 13 with signal magnet 14 which is connected by wire 15 with the other side of the generator B. 16 designates the drop annunciator or signal piece which shows the number of the station calling, this drop annunciator being normally upheld by the latch 17 of an armature 18 for the magnet 14. In dropping the signal piece closes a contact 19 to complete a local circuit through a buzzer 20 the numeral 21 designating the local battery. The other contact piece 22 of the above mentioned companion jack set connects by wire 23 with the receiver 2. The numeral 23ª designates the plug whose point 24 engages the end of the contact piece 9 to break the contact between the members of one jack set while the other portion of the plug acts against the contact piece 22 for a similar purpose. 25 designates the telephone receiver at the credit desk connected by a wire 26 with the generator and 27 designates the transmitter at this central station connected by a wire 28 with contact piece 29. A similar contact piece 30 connects by wire 31ª with the generator B, and spring contact strips 31 and 32 are arranged to engage the contact pieces 29 and 30 respectively through the operation of a switch lever 33 for the purpose of closing the talking circuit to the particular station calling, it being noted that the contact piece 31 connects by wire 34 with the plug 23ª while the contact piece 32 connects by wire 35 with the point 24 of the plug which is of course insulated from the body portion of said plug. This switch lever 33 which in being turned one way closes the talking circuit also operates when turned in the opposite direction to close a circuit for ringing a call bell at the station, and to this end coöperates with a pair of spring contact strips 36 and 36′ paired with contact strips 37 and 37′, strip 37 connecting by wire 38 with one side of the generator and strip 37′ connecting by wire 39 with the other side of the generator, whereas the switch strip 36 connects by wire 40 with the call bell 41 the latter connecting by wire 42 with the wire 23. It will be noted furthermore that the other switch strip 36′ connects by wire 43 with wire 34 running to the plug. An ordinary single stroke direct current bell is employed and different characters of signals can be given by the use of it according to how the switch lever 33 is manipulated. The bell might be rung twice for example to call the sales person's attention to the absence of paper in the stamp and might be rung a single time to indicate that the credit person desires to talk with the sales person.

The marking or stamping device is indicated diagrammatically at 44 and a wire 45 runs into its magnet from the wire 8 on one side while a wire 46 runs out of said magnet on the other side and extends to a contact strip 47 of a pair, the other member 48 of which is connected by a wire 49 with the wire 35 running to the point 24 of the jack plug. The two spring contact strips 47 and 48 are operated by a switch lever 49ª to make contact with strips 50 and 51 respectively which are connected by wires 52 and 53 respectively with the opposite poles of the generator B. It is to be understood that the switch lever 49ª and the "No paper signal" under the control thereof are common to the various approval recording devices used in the system the same as the switch lever 33 controlling the talking and bell ringing circuits. Normally the strips 47 and 48 rest in contact with strips 54 and 55 the former connected by wire 56 with one pole of the local battery 21 while the other strip 55 is connected by a wire 57 to a magnet 58 which magnet is connected by a wire 59 with the other pole of said local battery. This magnet 58 controls a flash or screen 60 compounded with a weighted armature 61. So long as the magnet 58 is energized the flash exposes a sign located as at 62 which sign indicates the absence of paper from the stamp as for example by showing the words "No paper."

Reverting to the stamp, the numeral 63 designates a shunt around the magnet of the stamp which shunt is completed by contacts 64 designed to be displaced when a slip is inserted in the stamp to be printed.

It will be seen that with such a system as illustrated in Fig. 1 a mode of operation such as heretofore indicated may be carried out for it will be seen that upon lifting the receiver 2 from the hook the call is sent in to the credit desk and then upon insertion of the plug the signal circuit is broken and the talking circuit made but that under either adjustment connections are complete for operating the stamp by the lever 49$^a$ provided of course a paper slip has been inserted in the stamp. Furthermore it will be observed that the circuit is closed normally through the local battery 21 with the effect of exposing the sign which shows that there is no paper in the stamp but that this circuit relies upon the shunt 63 and consequently as soon as the latter is broken this battery current then flows through the coils of the stamp magnet 44, the effect of which is to throw such increased resistance into this local battery circuit that the current therein becomes very much weakened consequently the magnet 58 is deënergized and the sign 62 concealed thereby showing the credit man that the paper slip is in the stamp. When the shunt is thus broken the current from the generator will go through the magnet of the stamp when the lever 49$^a$ is thrown over and the stamp will thus be actuated.

The circuits are as follows:

*Original call circuit.*—Generator wire 11, contact strip 10, contact strip 9, wire 8, transmitter 7, wire 6, hook 3, wire 5, receiver 2, wire 23, contact strip 22, contact strip 12, wire 13, magnet 14, wire 15 back to generator.

The local buzzer circuit is obvious.

*Talking circuit.*—Generator wire 26, receiver 25, transmitter 27, wire 28, contact strip 29, contact strip 31, wire 34, plug 23$^a$, contact strip 22, wire 23, receiver 2, wire 5, hook 3, wire 6, transmitter 7, wire 8, contact 9, plug point 24, wire 35. contact strip 32, contact strip 30, wire 31$^a$ back to generator.

*Station call circuit.*—Generator wire 26, wire 38, contact strip 37, contact strip 36, wire 40, bell 41, wire 42, wire 23, contact strip 22, plug 23$^a$, wire 34, wire 43, contact strip 36′, contact strip 37′, wire 39 back to generator.

*No paper circuit.*—Battery wire 59, magnet 58, wire 57, contact strip 55, contact strip 48, wire 49, plug point 24, contact strip 9, wire 8, wire 45, contact strip 64, shunt wire 63, companion contact strip 64, wire 46, contact strip 47, contact strip 54, wire 56 back to battery 21.

*Normal stamp circuit.*—Generator wire 11, contact strip 10, contact strip 9, wire 8, wire 45, contact strip 64, shunt wire 63, companion contact strip 64, wire 46, contact strip 47, contact strip 50, wire 52 back to generator.

*Stamp circuit with plug inserted and paper in place.*—Generator wire 26, wire 53, contact strip 51, contact strip 48, wire 49, plug point 24, contact strip 9, wire 8, wire 45, magnet 44, wire 46, contact strip 47, contact strip 50, wire 52 back to generator.

Passing now to a detailed description of the approval recording device (Figs. 2–4) it is preferred to mount this upon the standard of the telephone transmitter although this is of course not essential. In the present instance brackets 65 are secured to this standard 66 and a solenoid magnet 67 is mounted between these brackets, the core 68 of the solenoid having preferably the conical formation 69 of the armature end confronting a similarly formed surface 70 of the magnet. The solenoid core has a stem 71 which extends upwardly through the magnet and through the upper bracket arm 65 and is formed with a head 72 which constitutes the stamping plunger to be thrust upwardly whenever the solenoid magnet is energized. Erected upon the upper bracket arm is a platform 73 having an open center through which the stamp 72 may work. This platform is of metal and continuous at the front side for the purpose of conveying an electric current as presently to be described. Resting with their outer curved ends upon this continuous portion of the platform are two resilient fingers or contact strips 64 of metal which are secured at their rear ends to the rear portions (Fig. 2) of the platform where they are connected respectively with the wires 45 and 46 (Fig. 2) of the stamp circuit. These wires 45 and 46 are also connected with the opposite ends of the winding of the solenoid magnet 67 but so long as the contact is made between the fingers 64 and the platform 73 the current will pass through the shunt thus formed, it providing a path of less resistance than the magnet. Immediately upon the insertion of the paper charge slip by sliding it over the platform 73 and under the fingers 64 this shunt is broken and then the current will pass through the magnet.

In a suitable casing 76 mounted upon the upper bracket and leaving a space sufficient for the insertion of the slip from the side, are contained the necessary parts to complete the stamp. These comprise a sliding plate 77 dovetailed to a support 78 and open in the center as shown at 79 in Fig. 2, said plate having on its under side confronting the stamp 72 type characters preferably for identifying the station and indicating the significance of the mark to be made on the inserted slit as for example, the type character "A" on one side of the open center and the type characters making up the word "Charge" on the opposite side of the open center. This open center construction is for the purpose of accommodating dating stamps which are in form of disks 80 mounted to turn with some degree of friction upon the supporting shaft, these disks carrying suitable type for setting up any desired date. The removability of the stamping plate 77 is principally for the purpose of making it interchangeable with other plates having different type characters. For the purpose of locking the plate in position after being once inserted it is made with a groove 81, and there is mounted upon the support 78 a turn piece 82 with a flange 83 having a cutaway side 84. When turned to the position shown in Fig. 3 the flange enters the groove 81 and locks the plate in position. When given a quarter turn the flat side 84 will be brought above the plate 77 leaving it free to be removed.

Figure 2:
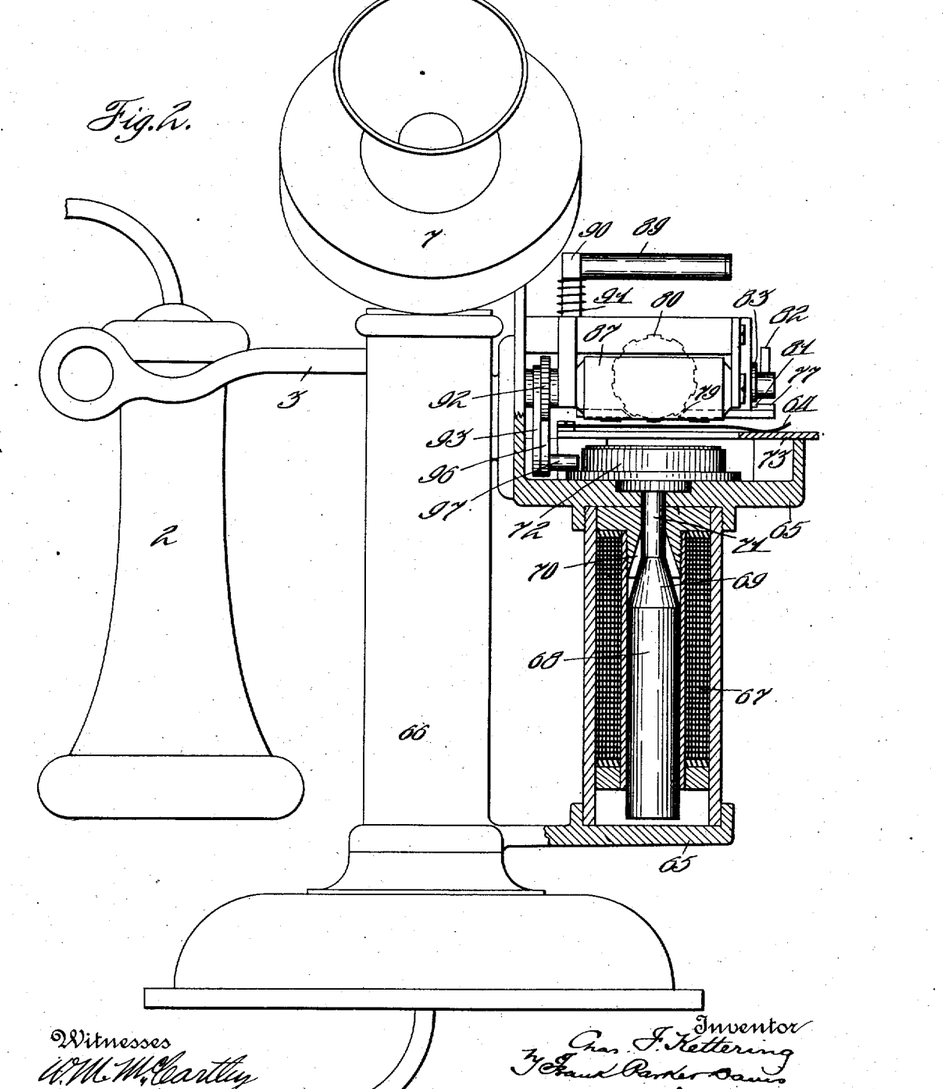
Fig. 2 represents one of the telephones at the bundle station with stamping attachment in cross-section.
Figures 3, 4:
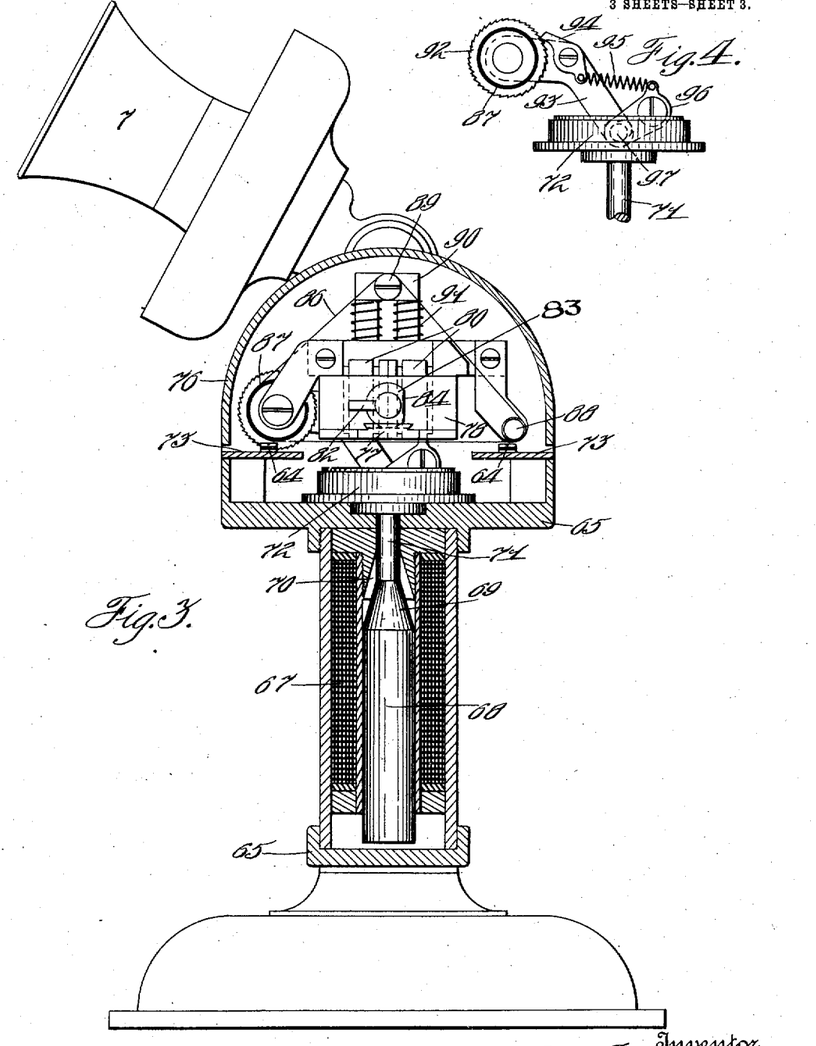
Fig. 3 represents a section taken through the stamping attachment at right angles to the section shown in Fig. 2.
Fig. 4 illustrates the ribbon feeding mechanism employed in the stamp.

The reference numeral 86 designates an inking ribbon, one stretch of which passes under the type characters on the plate 77 and the dating disks. This ribbon passes around a drum 87, a guiding stud 88 and a tensioning stud 89, the latter being a projection of a head 90 pressed upwardly from the support 78 by springs 91. The drum 87 has compounded with it a ratchet 92 (see Fig. 4) and there is journaled upon the axis of the drum an arm 93 carrying a pawl 94 pressed into engagement with the ratchet by a spring 95 connecting its rear end with an ear of a short arm 96 on the stud of the framework and jointed by slot and pin connection to the arm 93. The coupling pin 97 projects over a flange of the stamp 72 as shown in Fig. 2 so that upon the rise of the stamp the toggle formed by the arms 93 and 96 is straightened with the effect of feeding the inking ribbon through the ratchet and pawl construction already described.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

Having thus described my invention, what I claim as new and desire to secure by Letters Patent is;

1. In a system of the character described, the combination of a distant signaling means, means for transmitting messages between the signal sending and receiving stations, a marking device at the sending station controlled as to operation from the receiving station through the medium of the message transmitting agency, and means preventing or permitting the operation of the marking device at will.

2. In a system of the character described, the combination of a distant signaling means, means for transmitting messages between the signal sending and receiving stations, and a marking device at the sending station controlled as to operation from the receiving station through the medium of the message transmitting and the signaling agencies.

3. The combination with a telephone system including signal and talking circuits alternately operable, of a marking device at one station arranged to be operated from the other end of the line through the medium of the telephone connections under either signal or talking adjustments.

4. In a system of the character described, the combination of a distant signaling means, means for transmitting messages between the signal sending and receiving stations, a marking device at the sending station controlled as to operation from the receiving station through the medium of the message transmitting and the signaling agencies, and means preventing or permitting the operation of the marking device at will.

5. The combination with a telephone system including signal and talking circuits alternately operable, of a marking device at one station arranged to be operated from the other end of the line through the medium of the telephone connections under either signal or talking adjustments, and means preventing or permitting the operation of the marking device at will.

6. In a system of the class described, the combination with means for establishing communication between distant points, of means at one of said points for recording the approval of what has been communicated, means at the other point controlling the operation of the approval recording means through the communicating means, and means notifying the operator of the controlling means whether the approval recording means is in condition to be operated.

7. In a system of the character described, the combination of a distant signaling means, means for transmitting messages between the signal sending and receiving stations, a stamping device at the sending station controlled as to operation from the receiving station through the medium of the message transmitting agency; and means preventing or permitting the operation of the stamping device at will.

8. In a system of the character described, the combination of a distant signaling means, means for transmitting messages between the signal sending and receiving stations, and a stamping device at the sending station controlled as to operation from the receiving station through the medium of the message transmitting and the signal agencies.

9. In a system of the character described the combination of a distant signaling means, means for transmitting messages between the signal sending and receiving stations, a stamping device at the sending station controlled as to operation from the receiving station through the medium of the message transmitting and the signaling agencies; together with a distant signal automatically controlled electrically and indicating the presence or absence of the article to be stamped.

10. In a system of the character described, the combination of a distant signaling means, means for transmitting messages between the signal sending and receiving stations, a marking device at the sending station controlled as to operation from the receiving station through the medium of the message transmitting agency; means preventing or permitting the operation of the marking device at will and a distant signal automatically controlled electrically and indicating the operativity of the marking device.

11. In a system of the character described, the combination of a distant signaling means, means for transmitting messages between the signal sending and receiving stations, a marking device at the sending station controlled as to operation from the receiving station through the medium of the message transmitting and signal agencies, means preventing or permitting the operation of the marking device at will, and a distant signal automatically controlled electrically and indicating the operativity of the marking device.

12. In a system of the character described, the combination of a distant signaling means, means for transmitting messages between the signal sending and receiving stations, a marking device at the sending station controlled as to operation from the receiving station through the medium of the message transmitting agencies; together with a distant signal automatically controlled electrically and indicating the presence or absence of the article to be marked.

13. The combination with a telephone system including signal and talking circuits alternately operable, of a marking device at one station arranged to be operated from the other end of the line through the medium of the telephone connection under either signal or talking adjustments, said marking device having means for rendering it inoperative in the absence of the article to be marked.

14. The combination with a telephone system including signal and talking circuits alternately operable, of a marking device at one station arranged to be operated from the other end of the line through the medium of the telephone connection under either signal or talking adjustments, said marking device having means including a shunt circuit for rendering it inoperative in the absence of the article to be marked.

15. The combination with a telephone system including signal and talking circuits alternately operable, of a stamping device at one station arranged to be operated from the other end of the line through the medium of the telephone connection under either signal or talking adjustments; said stamping device having means for rendering it inoperative in the absence of the article to be stamped.

16. The combination with a telephone system including signal and talking circuits alternately operable, of a stamping device at one station arranged to be operated from the other end of the line through the medium of the telephone connections under either signal or talking adjustments, said stamping device including a magnetic plunger; a shunt around the circuit; and a contact in the shunt circuit arranged to be broken by the insertion of the article to be stamped.

17. The combination with a telephone system including signal and talking circuits alternately operable, of a stamping device at one station arranged to be operated from the other end of the line through the medium of the telephone connections under either signal or talking adjustments, a rest or platform to receive a slip of paper, resilient fingers bearing upon said platform and arranged to hold the paper slip in place thereon, type carriers above the platform, a magnetic stamp working through the platform, and a shunt circuit around the magnet through the platform and resilient fingers.

18. In a system of the character described, a distant signaling means, means for transmitting messages between the signal and receiving stations, a marking device at the sending station controlled as to operation from the receiving station through the medium of the message transmitting agency; and a distant signal automatically indicating the presence or absence of the article to be marked.

19. The combination with a telephone system including signal and talking circuits alternately operable, of a marking device at one station arranged to be operated from the other end of the line through the medium of the telephone connections under either signal or talking adjustments; together with a distant signal automatically indicating the presence or absence of the article to be marked.

20. In a system of the character described, the combination of a distant signaling means, means for transmitting messages between the signal sending and receiving stations, and a marking device at the sending station controlled as to operation from the receiving station through the medium of the message transmitting agency, said marking device having means for rendering it inoperative in the absence of the article to be marked; together with a distant signal automatically controlled electrically and indicating the presence or absence of the article to be marked.

21. The combination with a telephone system including signal and talking circuits alternately operable, of a marking device at one station arranged to be operated from the other end of the line through the medium of the telephone connections under either signal or talking adjustments, said marking device having means for rendering it inoperative in the absence of the article to be marked; together with a distant signal automatically indicating the presence or absence of the article to be marked.

22. The combination with a telephone system including signal and talking circuits alternately operable, of a marking device at one station arranged to be operated from the other end of the line through the medium of the telephone connections under either signal or talking adjustments, said marking device having means including a shunt circuit for rendering it inoperative in the absence of the article to be marked; together with a distant signal automatically indicating the presence or absence of the article to be marked, said signal being in a circuit including the shunt.

23. In a system of the class described, the combination with means for establishing communication between distant points, of means at one of said points for recording the approval of what has been communicated, means at the other point controlling the operation of the approval recording means through the communicating means, mechanism for notifying the operator of the controlling means whether the approval recording means is in condition to be operated, and means for notifying the attendant of the approval recording means of the condition thereof.

24. In a system of the class described, the combination with means for establishing communication between distant points, of means at one of said points for recording the approval of what has been communicated, means at the other point controlling the operation of the approval recording means through the communicating means, and means for placing the approval recording means in inoperative or operative condition at will.

25. In a system of the class described, the combination with means for establishing communication between distant points, of means at one of said points for recording the approval of what has been communicated, means at the other point controlling the operation of the approval recording means through the communicating means, mechanism for placing the approval recording means in inoperative or operative condition at will, and means notifying the operator of the controlling means of the condition of the approval recording means.

In testimony whereof I affix my signature in the presence of two witnesses.

CHARLES F. KETTERING.

Witnesses:
WM. O. HENDERSON,
CARL W. BEUST.

---

It is hereby certified that in Letters Patent No. 975,533, granted November 15, 1910, upon the application of Charles F. Kettering, of Dayton, Ohio, for an improvement in "Store-Service Credit-System Apparatus," an error appears in the printed specification requiring correction as follows: Page 5, line 118, after the word "automatically" the words *controlled electrically and* should be inserted; and that the said Letters Patent should be read with this correction therein that the same may conform to the record of the case in the Patent Office.

Signed and sealed this 3d day of January, A. D., 1911.

[SEAL.]

E. B. MOORE,

*Commissioner of Patents.*

20. In a system of the character described, the combination of a distant signaling means, means for transmitting messages between the signal sending and receiving stations, and a marking device at the sending station controlled as to operation from the receiving station through the medium of the message transmitting agency, said marking device having means for rendering it inoperative in the absence of the article to be marked; together with a distant signal automatically controlled electrically and indicating the presence or absence of the article to be marked.

21. The combination with a telephone system including signal and talking circuits alternately operable, of a marking device at one station arranged to be operated from the other end of the line through the medium of the telephone connections under either signal or talking adjustments, said marking device having means for rendering it inoperative in the absence of the article to be marked; together with a distant signal automatically indicating the presence or absence of the article to be marked.

22. The combination with a telephone system including signal and talking circuits alternately operable, of a marking device at one station arranged to be operated from the other end of the line through the medium of the telephone connections under either signal or talking adjustments, said marking device having means including a shunt circuit for rendering it inoperative in the absence of the article to be marked; together with a distant signal automatically indicating the presence or absence of the article to be marked, said signal being in a circuit including the shunt.

23. In a system of the class described, the combination with means for establishing communication between distant points, of means at one of said points for recording the approval of what has been communicated, means at the other point controlling the operation of the approval recording means through the communicating means, mechanism for notifying the operator of the controlling means whether the approval recording means is in condition to be operated, and means for notifying the attendant of the approval recording means of the condition thereof.

24. In a system of the class described, the combination with means for establishing communication between distant points, of means at one of said points for recording the approval of what has been communicated, means at the other point controlling the operation of the approval recording means through the communicating means, and means for placing the approval recording means in inoperative or operative condition at will.

25. In a system of the class described, the combination with means for establishing communication between distant points, of means at one of said points for recording the approval of what has been communicated, means at the other point controlling the operation of the approval recording means through the communicating means, mechanism for placing the approval recording means in inoperative or operative condition at will, and means notifying the operator of the controlling means of the condition of the approval recording means.

In testimony whereof I affix my signature in the presence of two witnesses.

CHARLES F. KETTERING.

Witnesses:
WM. O. HENDERSON,
CARL W. BEUST.

---

It is hereby certified that in Letters Patent No. 975,533, granted November 15, 1910, upon the application of Charles F. Kettering, of Dayton, Ohio, for an improvement in "Store-Service Credit-System Apparatus," an error appears in the printed specification requiring correction as follows: Page 5, line 118, after the word "automatically" the words *controlled electrically and* should be inserted; and that the said Letters Patent should be read with this correction therein that the same may conform to the record of the case in the Patent Office.

Signed and sealed this 3d day of January, A. D., 1911.

[SEAL.]

E. B. MOORE,

*Commissioner of Patents.*

Correction in Letters Patent No. 975,533.

It is hereby certified that in Letters Patent No. 975,533, granted November 15, 1910, upon the application of Charles F. Kettering, of Dayton, Ohio, for an improvement in "Store-Service Credit-System Apparatus," an error appears in the printed specification requiring correction as follows: Page 5, line 118, after the word "automatically" the words *controlled electrically and* should be inserted; and that the said Letters Patent should be read with this correction therein that the same may conform to the record of the case in the Patent Office.

Signed and sealed this 3d day of January, A. D., 1911.

[SEAL.]

E. B. MOORE,

*Commissioner of Patents.*